United States Patent [19]
Lee et al.

[11] Patent Number: 5,799,001
[45] Date of Patent: Aug. 25, 1998

[54] COMPOSITE NETWORK PROTECTIVE/ RECOVERING DEVICE FOR SYNCHRONOUS DIGITAL HIERARCHY DXC

[75] Inventors: Dong Choon Lee; Jae Guen Kim; Ho Geon Kim; Ho Jae Lee, all of Daejeon, Rep. of Korea

[73] Assignees: Electronics and Telecommunication Research Institute, Daejeon; Korea Telecommunications Authority, Seoul, both of Rep. of Korea

[21] Appl. No.: 578,418

[22] Filed: Dec. 26, 1995

[30] Foreign Application Priority Data

Dec. 23, 1994 [KR] Rep. of Korea .................. 1994 36957

[51] Int. Cl.[6] .................................................. H04L 12/437
[52] U.S. Cl. .......................... 370/220; 370/223; 370/907; 395/182.02
[58] Field of Search .............................. 370/221, 222, 370/223, 224, 225, 217, 220; 359/110, 119; 392/182.01, 182.02

[56] References Cited

U.S. PATENT DOCUMENTS 4,951,280 8/1990 McCool et al. ......................... 370/224
5,475,676 12/1995 Takatori et al. ......................... 370/222
5,537,393 7/1996 Shioda et al. ......................... 370/223
5,544,151 8/1996 Baek et al. ......................... 370/223

*Primary Examiner*—Benedict V. Safourek
*Assistant Examiner*—Min Jing
*Attorney, Agent, or Firm*—Jacobson, Price, Holman & Stern, PLLC

[57] ABSTRACT

A composite network protective/recovering device includes first to fourth input/output (I/O) modules. The first and third I/O modules are operational modules and the second and fourth I/O modules are protective modules. A first span connection group connects the first I/O operational module with the second I/O protective module. A second span connection group connects the third I/O operational module with the fourth I/O protective module to perform span switching. A first bidirectional line switching ring connects the first I/O operational module and the third I/O operational module to form a bidirectional ring which has two lines in each direction. A second bidirectional line switching ring is connected to the first to fourth I/O modules to form transmitting/receiving operational lines which include two lines in each direction and protective lines which include two lines in each direction. Cross-connection (DXC) module performs cross-connecting function between signals which are transferred through the I/O modules and classifies signals to be added or dropped.

2 Claims, 18 Drawing Sheets

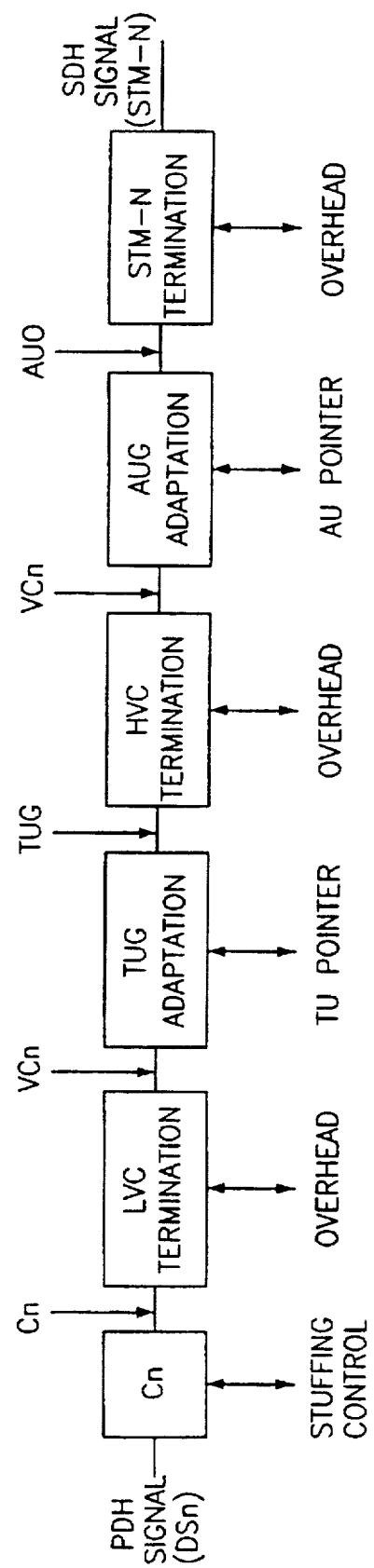

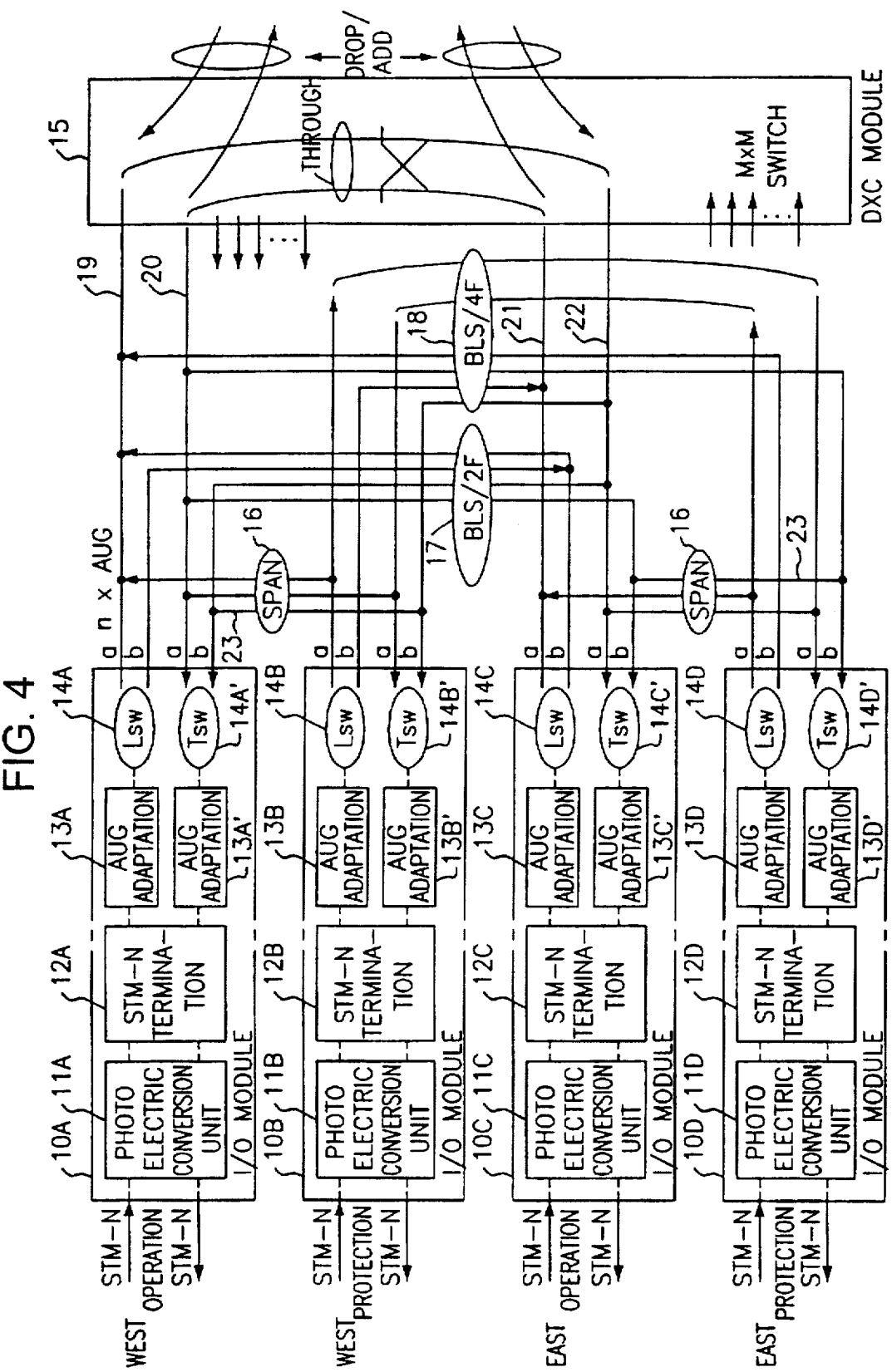

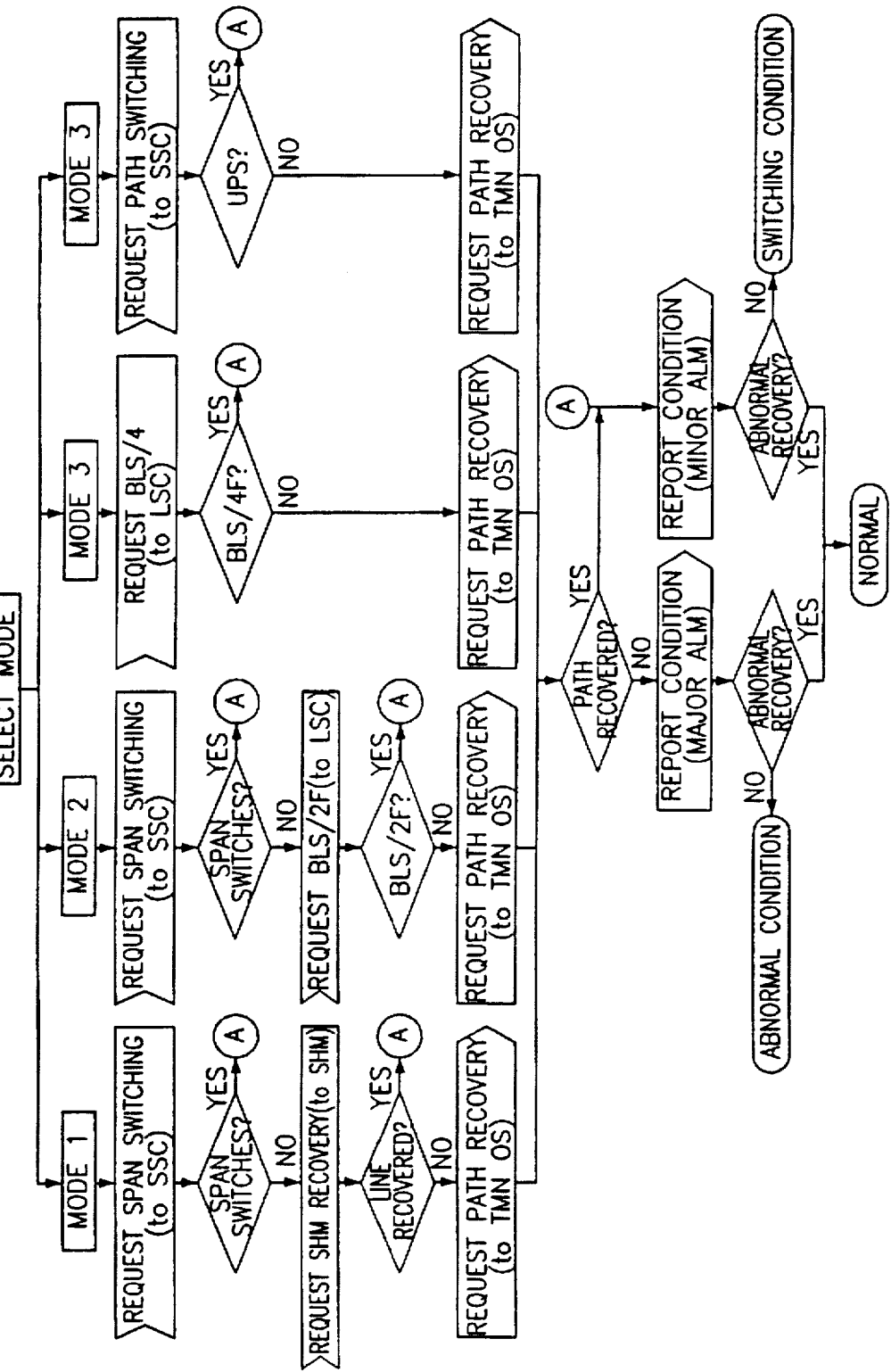

COMPOSITE NETWORK PROTECTIVE/ RECOVERING DEVICE FOR SYNCHRONOUS DIGITAL HIERARCHY DXC

BACKGROUND OF THE INVENTION

The present invention relates to a composite network protective/recovering device for synchronous digital hierarchy digital cross-connect(SDH DXC), and more particularly, to a composite network protective/recovering device which can be adapted to each network protective/recovering function of SDH DXC without switching of the hardware module or software module according to the various network configuration types.

FIG. 1A shows the general SDH device by which the PDH (Plesiochronous Digital hierarchy) signals is connected and multiplexed into SDH signal in SDH/SONET(Synchronous Digital Hierarchy/Synchronous Optical Network).

As for each signal and overhead process of the function blocks of SDH device in FIG. 1A, the disclosures of G.707,708 suggested by ITU-T is applied. The virtual container (VC), which is one of the multiplex elements, is standardized to have the structure and capacity suitable for synchronous multiplex, and is applied for abstracting the existing PDH signal or multiplexing between the lower order VC (LVC) and higher order VC (HVC), where VCs are ultimately transmitted within the payload of the synchronous transmission format of the synchronous transport module level-N (STM-N).

In the above multiplex process, the differences in the data rates between VCs caused by the differences in the clock between the transmitting/receiving STM-N signals, is compensated by using the tributary unit (TU) pointer for the LVC and HVC signals, and by using the administrative unit pointer for STM-N and HVC.

SDH/SONET based SDH DXC has the functions of cross-connecting the VCn signals contained in the plurality of input STM-N signals into the plurality of output STM-N signals, and classifying the signals to be added/dropped.

FIG. 1B is a typical function block configuration of SDH DXC. Referring to FIG. 1B, the broad-band DXC is located in the transit point of the transmission lines, at which plurality of input/output optical links and plurality of add-dropped signal links are concentrated. The broad-band DXC comprises the various signal connections as shown in FIG. 2, through which operational reliability of electrically managed network and sevices thereof can be improved.

The typical basic network configuration of the broad-band DXC includes point to point (PTP) type, which connects each of the SDH terminals or each of the broad-band DXCs; ring type, which connects each of the SDH add-drop multiplexers (ADMs); and mesh type, which connects each of plurality of broad-band DXCs.

When the SDH network is constructed, suitable measures for protecting the network should be considered, by way of precaution against the troubles in communication caused by a disaster such as a fire or a flood.

The general network protection types in accordance with the various types of the SDH network, are as follows. PTP type network uses a span protection type as shown in FIGS. 3A–3C, in which an abnormal operational line is switched to a protection exclusive line; SDH ring type network uses a bidirectional line switching (BLS) type as shown in FIGS. 3D–3F or FIGS. 3G–3I, or a unidirectional path switching (UPS) type as shown in FIGS. 3J–3L, in which an abnormal operational line is switched to a protection exclusive channel (2F: 2 fiber) or a exclusive ring (4F: 4 fiber); and mesh type network uses a dynamic routing (DR) as shown in FIG. 3E, in which bypass route is formed by using the spare channel, if there is an abnormal operational line.

FIGS. 3A–3C illustrate 1+1 span switching type. In steady-state as shown in FIG. 3A, the receiving signal at the side of the operational line is selected, and the transmitting signal is bridged into the operational line and the protective line. In the abnormal state as shown in FIG. 3B, the receiving signal is switched from the operational line to the protective line by the line switching, and the transmitting signal is bridged as described above in connection with the case of steady-state. FIG. 3C illustrates the function of 1+1 span switching type.

FIGS. 3D–3F illustrate the bidirectional line switching (BLS/2F) type, in which protective lines are added in case of the composite operation with 1+1 span switching type. Their protective swtiching operation is the same as in FIGS. 3A–3C, and the operation of BLS/2F functions are as follows.

In steady-state as shown in FIG. 3D, the operational channel and the protective channel, each of which has the capacity of STM-N/2, are allocated at the line of each direction. And using each one half of the span capacity, bidirectional communication with the opposite directions can be made. Specifically, in case of the operational channel, the transmitting/receiving signals in each direction extract the local drop signal, and insert the transmitting signal onto the ring in the opposite ditection. But, in case of the protective channel, the transmitting/receiving signals in each direction are pass through toward the opposite side by DXC switch.

On the other hand, in the abnormal state of the WEST side as shown in FIG. 3E, instead of the STM-N/2 operational channel received from the WEST side, the STM-N/2 protective channel received from the EAST side is selected by the line switch. The STM-N/2 operational channel received from the EAST side, is the same as the steady-state case.

Further, the STM-N/2 operational channel to be transmitted to the WEST side is bridged to the operational channel in the WEST side and the protective channel in the EAST side, and thus the signal which was passed through the protective route in steady-state, is opened by the line switch. The operation of STM-N/2 protective route transmitted to the WEST side, is the same as the steady-state case. In case of abnormality in the EAST side, it operates with the similar function to the case of abnormality in the WEST side. FIG. 3F illustrates the function of the bidirectional line switching ring (BLS/2F) type.

FIGS. 3G–3I illustrate the bidirectional line switching ring (BLS/2F) type, the operational principle of which is similar to the BLS/2F type, except that the BLS/2F type employs the operational ring and protection exclusive ring.

In steady-state as shown in FIG. 3G, the signals on both side (EAST and WEST) of the operational ring are locally add/dropped or pass through by way of control of DXC switch. And, the receiving signal on the protective ring is simply routed toward the opposite side by way of DXC switch.

On the other hand, in the abnormal state of the WEST side as shown in FIG. 3H, instead of the received signal on the operational ring of the WEST side, the signal which is received onto the protective ring, is selected by the line switch. The signal which is transmitted to the operational ring in the EAST side, is operated as the steady-state case. Further, the signal which is transmitted to the operational ring in the WEST side, is transmitted to the protective ring in the EAST side through bridging by the line switch, while the receiving signal on the protective ring in the WEST side, which was transmitted onto the protective ring in the EAST side, is opened by DXC switch.

The signal which is transmitted onto the protective ring in the WEST side, is the same as the steady-state case. In case of abnormality in the direction of the EAST side, it operates by the similar principle to the case of abnormality in the WEST side. FIG. 3I illustrates the functional configuration of the bidirectional line switching ring (BLS/4F) type.

FIGS. 3J–3L illustrate the unidirectional path switching (UPS) type, in which the signal which is locally accessed on the ring, is dropped from the corresponding time slot on the operational ring and the protective ring by DXC switch if the signal is receiving signal, and simultaneously the dropped time slot is bridged by the corresponding transmitting signal. The remaining signals are passed to the opposite direction. At this time, among the signals extracted from the operational ring and the protective ring, the signal on the operational ring is selected in steady-state as shown in FIG. 3J. But, if there is some loss in the signal on the operational ring as shown in FIG. 3K, the signal on the protective ring is selected by switching so as to recover the services. Through HVC monitoring, the performance of the signal and the alarm conditions can be monitored. FIG. 3L illustrates the function of the unidirectional path switching (UPS) type.

FIGS. 3M and 3N illustrate the dynamic routing mesh type, in which the bypass route is formed by using the spare channel, against a network trouble. According to the dynamic routing mesh type, the bypass route is formed by changing the connection line of the spare channel among the channels which are connected to the DXC switch as in FIG. 3N, when the services are lossed by the mesh network trouble as in FIG. 3M. For example, in case of abnormality at the link of the side A, the local directional/coupling signal is switched to the route (recovery route in FIG. 3N) which was received from the bypass route formed by using the spare channel from an another synchronous digital hierarchy digital cross-connect (SDH DXC), instead of the operational channel received from the link A in steady-state, in order to recover the network trouble. And, the cross connection signal to an another office forms the correlated route (bypass route in FIG. 3N) with the another synchronous digital hierarchy digital cross-connect (SDH DXC), by using the spare channel between the input/output of the synchronous digital hierarchy digital cross connect (SDH DXC).

In this description, SHR (self healing ring) means the ring network which heals the failures by itself in case of trouble in network, and SHM (self healing mesh) means the mesh network which heals the trouble by itself in case of failures in network. The general characteristics of such network protective recovering method, is that span protective method has the simple switching control algorithm, but needs large amount of cost for physical links, conduits and the like. And, the construction of SHR has the fast recovering time (within 50 ms), but has more complicated control algorithm than the span protective method. In the SHR method, BLS type needs far more complicated protocol than UPS type. SHM has the complicate correlation process for utilization of the spare channel between each node (or by the centralized control system) and the communication protocol thereof, and has far longer network recovering time than SHR. Despite of the above, network recovery can be made even if a lot of troubles are incurred simulaneously, because various bypass route may be formed.

Therefore, in order to recover the troubles in the transmission network, it is preferable that the network having a small traffic carrying capacity and simple network structure employs span portective or SHR, which has good properties in recovery time and control; mesh network having a large traffic carrying capacity employs SHM; and the composite network of ring and mesh employs all of the span protective, SHR and SHM, for the composite recovery.

Although the basic network of the synchronous digital hierarchy digital cross-connect (SDH DXC), may be formed with the star network and mesh network at the early stage, hereafter according to the development in SDH network, SDH network will be developed from the early stage to the developed stage using the combinational network of mesh and ring as well as the the connection of ADM ring network, which may be widely used at the early stage. Therefore, SDH DXC should be correlated with the linear span connection, BLS/2F ring connection, BLS/4F ring connection, UPS ring connection, and the mutual connection between SDH DXCs, and simultaneously should be cooperated with the related network protective/recovering method.

SUMMARY OF THE INVENTION

Thus, it is an object of the present invention to provide a composite network protective/recovering device which can be adapted to the network protective/recovering functions of SDH DXC without switching of the hardware module or software module according to the various network types, and can improve the reliability of the network through the composite recovery of each type in the various combinational network types, using the capability of simultanous application thereof.

To accomplish the above object, the present invention provides a composite network protective/recovering device comprising: first to forth I/O modules 10A to 10D which is dualized with the operarional modules 10A and 10C and the protective modules 10B and 10D; span connection groups 16 which are connected between said first I/O operational module 10A and second I/O protective protective module 10B, and between said third I/O operarional module 10C and forth I/O protective module 10D, respectively to perform span switching; BLS/2F connection group 17 which is connected between said first I/O operational module 10A and third I/O operational module 10C to form a bidirectional 2 line ring for the opposite directions; BLS/4F connection group 18 which is connected to said first to forth I/O modules 10A to 10D to form the transmitting/receiving operational lines (2 lines) and protective lines (2 lines); and cross-connection (DXC) module 15 for performing the cross-connecting function between the connected AU signals through said I/O modules 10A to 10D, and the classifying function of the signals to be added/dropped to the own office.

BRIEF DESCRIPTION OF THE DRAWINGS

Additional objects and advantages of the present invention will be apparent from the detailed description of preferred embodiments thereof, which proceeds with reference to the accompanying drawings in which:

FIGS. 1A and 1B illustrate the operation of a general synchronous digital hierarchy digital cross-connect(SDH DXC) device.

FIG. 4 is a schematic diagram according to an embodiment of the present invention.

FIG. 11 is a flow chart of the network protective/recovering process.

DETAILED DESCRIPTION OF THE INVENTION

FIG. 4 is the configuration of the composite network protective/recovering device according to the present invention, which has the Input/Output (I/O) modules 10A to 10D having the same circuit configuration, and performs the photoelectric conversion between the SDH optical signal and AUG electrical signal, STM-N termination, signal multiplex function, and broad-band switching function for network protection/recovery.

The 1+1 span switching configuration includes I/O operational modules 10A and 10C which process the optical signal on the operational line, and I/O protective modules 10B and 10D which connect the exclusive protective line provided for the countermeasure against the failures of the I/O operational modules 10A and 10C. Each pair of the modules 10A and 10B, and 10C and 10D is operated in the both side of the WEST and EAST directions, respectively.

BLS/2F ring uses only two operational modules 10A and 10C, and consists the bidirectional (EAST⇌WEST) ring by two lines for the opposite directions. And, if necessary, BLS/2F ring can be used as 1+1 span switching between the nodes on the ring by using the protective modules 10B and 10D. BLS/4F ring uses four modules 10A to 10D, which consist the transmitting/receiving operational lines (2 lines) and the protective line (2 lines) for the opposite directions. BLS/4F ring functions as two operational rings (combination of 10A and 10B) and two protective rings (combination of 10C and 10D), both of which is operated toward the opposite directions.

Figure 1B:
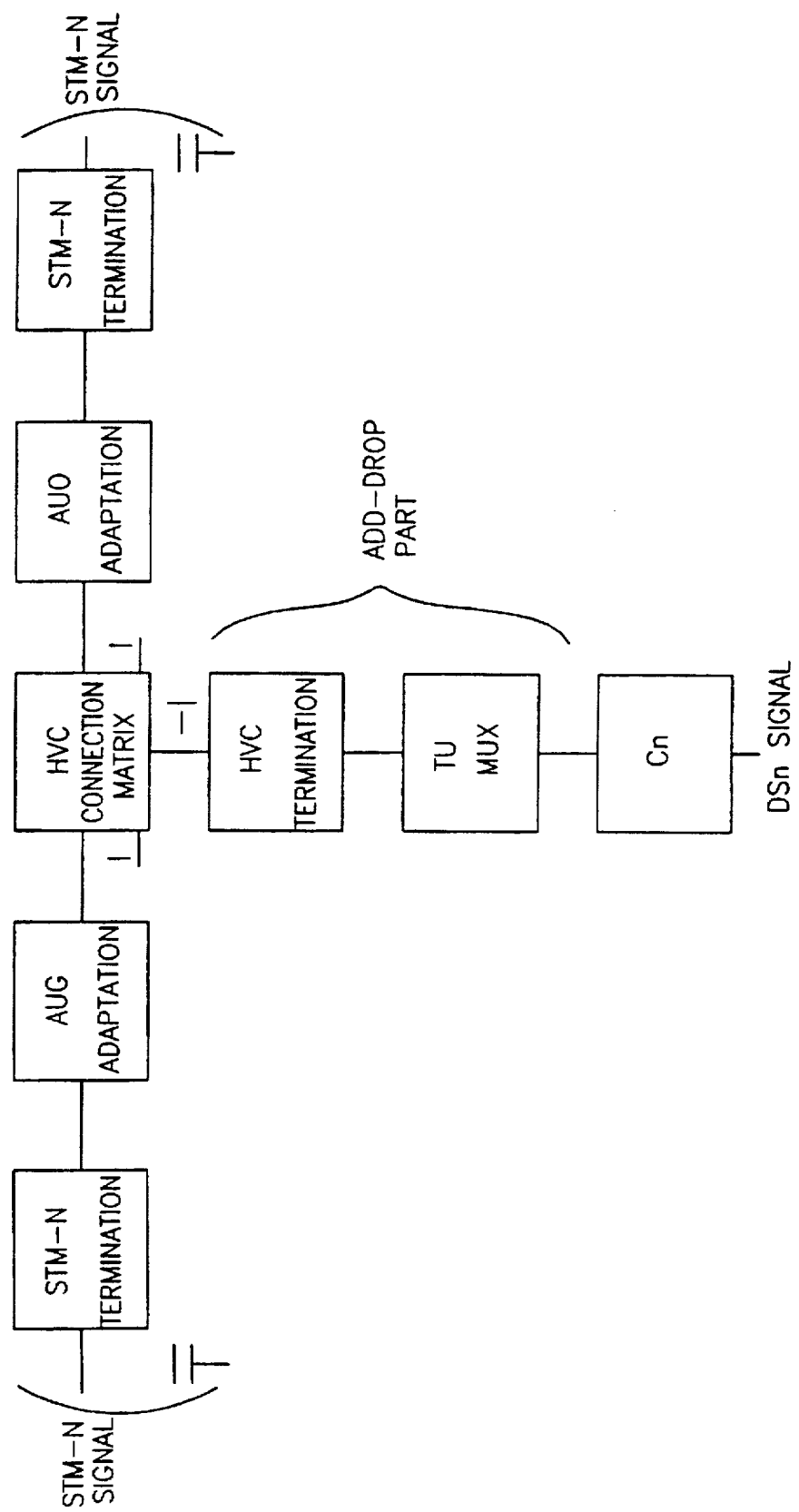
Figure 2:
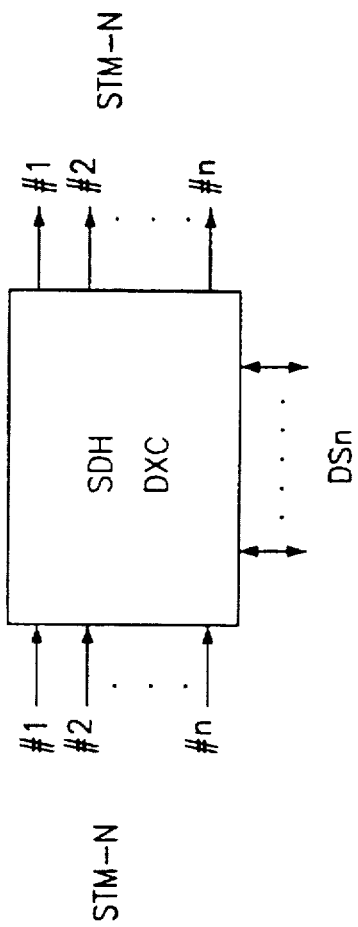
FIG. 2 illustrates the input/output signal of synchronous digital hierarchy digital cross-connect(SDH DXC) device.
Figure 3A:
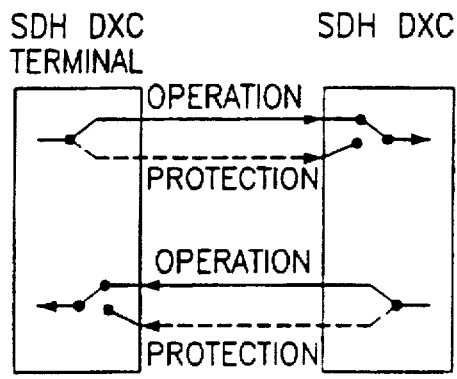
FIGS. 3A–3N illustrate the principle of the conventional network protection method.
Figure 3B:
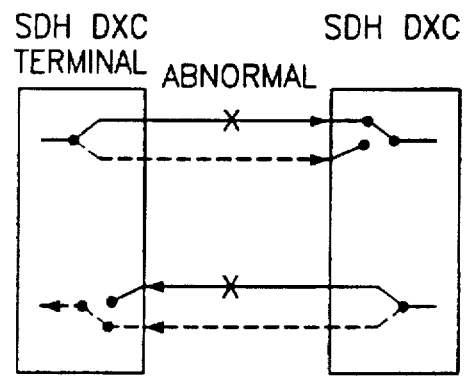
Figure 3C:
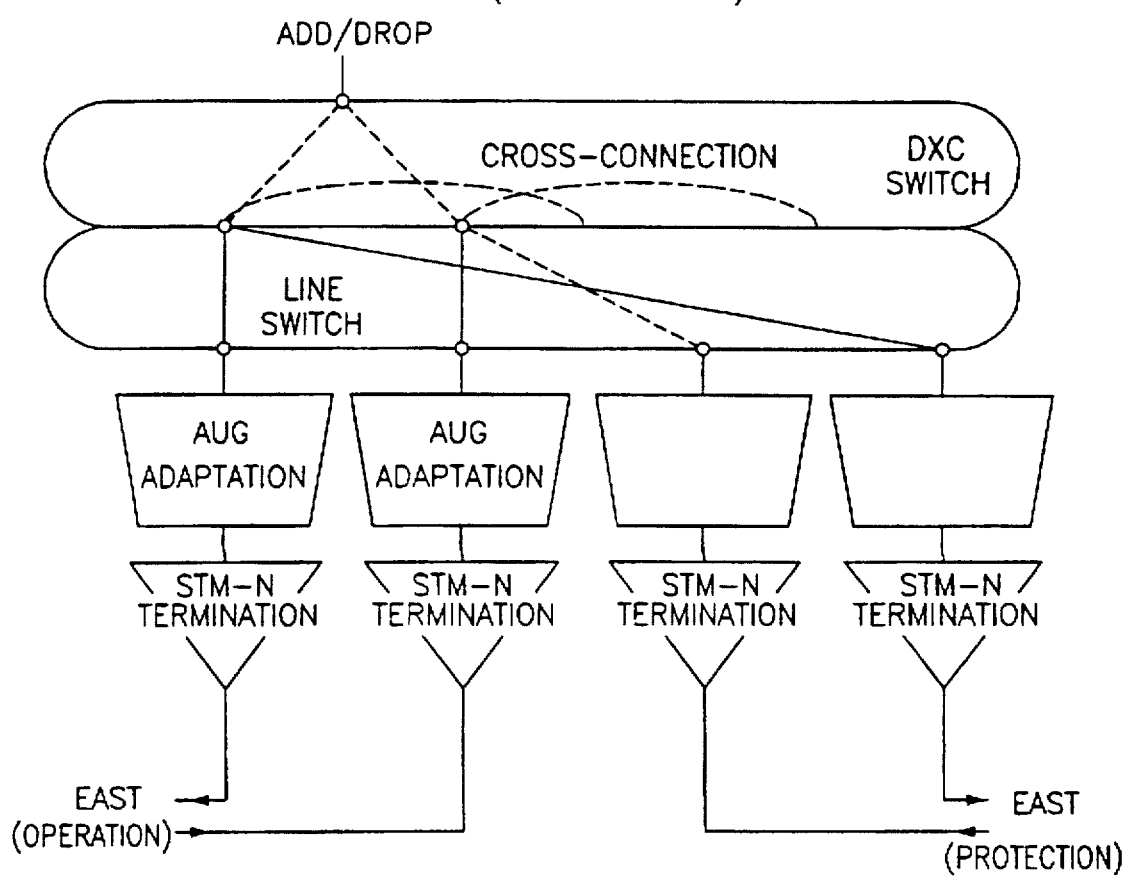
Figure 3D:
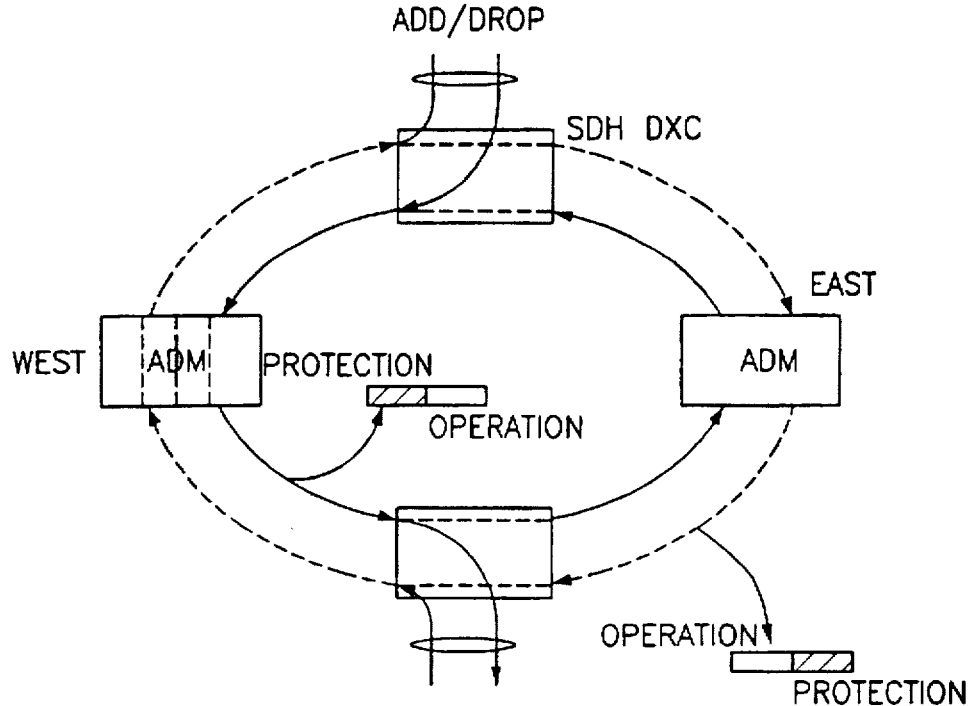

Also, the mesh network configuration has the same configuration as the 1+1 span switching configuration. Further, the configuration of the UPS ring includes the modules, each of which has the same role as BLS/2F ring. The path switching as shown in FIG. 3D is performed at a cross-connection module 15. Cross-connection module 15 performs the cross-connection function between the connected AU signals through I/O modules 10A to 10D as a M×M broad-band switch modules, so that the signals are transmitted through I/O modules 10A to 10D. Otherwise, cross-connection module 15 has the function of classifying the signals to be branched and inserted into the own office, as shown in FIG. 3B to 3D. Also, cross-connection module 15 has the function of test access for a particular signal.

The signal which is connected from I/O modules 10A to 10D to cross-connection module 15, passes through the configuration of the connection groups 16 to 18 for each switching type, to the selected connection lines 19 to 22. In steady-state, the signal selects the I/O module 10A and connection lines 19 and 20, as well as I/O module 10C and connection lines 21 and 22, which are directly connected between the operational modules 10A and 10C and cross connection-module 15. On the other hand, if it is in failures, the signal is selected according to the connection groups 16 to 18 for each switching type by the switching control of line switch Lsw and time switch Tsw on I/O modules 10A to 10D. The configuration of FIG. 4, which represents the configuration of the minimum unit for processing the functions as above in case of SDH DXC configuration, may comprise the configuration of plurality of I/O modules 10A to 10D according to the DXC processing capacity.

Next, an operation of the particular function groups will be described in reference to FIG. 4.

Referring to FIG. 4, photoelectric conversion unit 11A of the I/O operational modules 10A and 10C for the opposite directions, is photoelectrically converted by connecting the STM-N optical signal. STM-N terminal unit 12A performs terminating operation of STM-N signal, such as STM-N frame synchronizing, and descrambling, extracting and processing of regenerator section/multiplex section overhead.

After the terminating operation is performed, AUG adaptive unit 13A separates the AUG signals, compensates the clock difference between the received clock and SDH DXC clock and matches the phases by adjusting the AU pointer, connects the received AUG signal by bridging or switching on the connection line a or b, or opens the connection between a and b using line switch (Lsw) 14A.

Time switch (Tsw) 14A' has a function of selecting one of the connection lines a and b, by connecting the connection lines, or changing a particular time slot (channel) on the two connection lines. AUG signal, which was processed in time switch 14A', is processed by the transmission AU pointer of AUG adaptive unit 13A, during which the phase of the transmitting signal is adjusted. And then, the multiplex of the AUG signal and the insertion of regenerator section/multiplex section overhead are performed, before framing, scrambling, and photoelectric conversion for the transmission thereof.

Next, the specified control operation realizing the function for protecting each network using line switch Lsw and time switch Tsw, will be described in reference to FIG. 4.

At first, 1+1 span switching operation of connection group 16 is as follows. The received signal on the I/O operational module 10A and I/O protective module 10B, is controlled so as to be connected to connection line 19 by the line switch Lsw of each module, wherein the line switch Lsw of each module selects the signal on the operational module (each "a" of the line switches 14B and 14D is opened) in case of steady-state, but selects the signal on the protective module (each "a" of the line switches 14A and 14C is opened) in case of failures.

And, the transmitting signal bridge the signal on connection line 19 to modules 10A and 10B, and time switch Tsw of each module selects only "a" terminal. The control operation of the other pair of modules 14C and 14D is similar to the above operation.

The configuration of BLS/2F of connection line 16 can be formed by selecting any one of I/O operational modules 10A and 10C, and I/O protective modeles 10B and 10C. In steady-state, the received signal of each operational module passes through connection lines 21 and 22 to cross-connection module 15, by selecting "a" of line switch Lsw. In failures, line switch Lsw of the operational module in the side of failures (EAST or WEST), is opened in all output thereof. And, line switch Lsw of the operational module in the opposite side, output the received signal simultaneously to "a" and "b", by which the signal is connected through connection line 19 and 21 to cross-connection module 15.

And, transmitting signal is selected by time switch Tsw on the I/O operational modules 10A and 10C. Firstly, in steady-state, time switch Tsw of the I/O operational module is controlled to select only the signal (terminal "a") directly connected between the operational modules 10A and 10C, and cross-connection (DXC) module 15. In failures, the signals which is output from switching module 15 to the operational module in the side of failures (WEST or EAST), are looped to the side of the operational module of normal operation. Time switch Tsw forms the transmitting signal by selecting the operational channel allocated in terminal "b", instead of the protection executive channel allocated in terminal "a", among the signals input from terminals "a" and "b". In this connection, BLS/2F type is applied such a manner that each of the operational channel and the protection exclusive channel has has ½ of the entire capacity of each span. In case that BLS/2F and span switching functions are applied at the same time, first of all span switching is performed independently of BLS/2F, and then performs the recovery by BLS/2F only for the case of incapability of the recovery by span switching.

And, when an any section on the ring formed by SDH DXCs is on the span switching condition, it is possible to perform span switching and BLS/2F recovery repeatedly, even in case that an additional failures is occurred in the other section or node. In order to impart the independent recovery system of dual type, the configuration comprises connection line 23 which is added to connection group 16 to bridge the signals on the operational line and protective line which are transmitting to the same destination. Here, the control operation of time switch Tsw on the protective module is similar to that of the operational module.

Also, on the BLS/2F switching condition, the characteristics of 1+1 span switching can be maintained by connection groups 16 and 17, and independent BLS/2F switching can be performed.

BLS/4F configuration of connection grooup 18 consists the operational ring by using the I/O operational modules 10A and 10C, and consists the bidirectional protection exclusive ring by using the protective modules 10B and 10D. In steady-state, pass signal and branch insertion signal on the operational ring is made by switching of cross-connection module 15, and in case of the protective ring, it has only the function of simple routing the received signal to output it, without connection to cross-connection module 15. Specifically, line switch Lsw on the operational module always transmit the signal to terminal "a" (terminal "b" is opened), and time switch Tsw always select terminal "a". Line switch Lsw on the protective module always transmit the signal to terminal "a" (terminal "b" is opened), and time switch Tsw always select terminal "a". If there is a loss of signal due to the failures in any directional optical line or the operational module, line switch Lsw on the operational module in the side (WEST/EAST) suffering the loss is opened to output all of the signals. And, as a substitute, the signal which is input from line switch Lsw on the protective module received from the opposite side (EAST/WEST) is connected through connection line 19 to switching module 15.

All of the signals which are output from cross-connection module 15 to the side (WEST/EAST) suffering the loss, are looped (only terminal "b" is selected) by time switch Tsw on the protective module to transmit the signals. But, when BLS/4F is selected, all connection group 16 for span switching is opened.

The following table I shows the detailed controls of each line switch Lsw and time switch Tsw within I/O module, for realizing 1+1 span switching and SHR capability as above.

TABLE 1

| switch | module | terminal | span switching | normal/switch BLS/2F | BLS/4F |
|---|---|---|---|---|---|
| line switch (Lsw) | WT-1 | a | on/off | on/off | on/off |
|  |  | b | off/off | off/off | off/off |
|  | WT-2 | a | off/on | (on/on) | on/on |
|  |  | b | off/off | off/off | off/off |
|  | ET-1 | a | on/off | on/on | on/on |
|  |  | b | off/off | off/on | off/off |
|  | ET-2 | a | off/on | (off/on) | on/on |
|  |  | b | off/off | off/off | off/on |
| time switch (Tsw) | WT-1 | a | on/on | on/(on) | on/on |
|  |  | b | off/off | off/(on) | off/off |
|  | WT-2 | a | on/on | on/on | on/on |
|  |  | b | off/off | off/(on) | off/off |
|  | ET-1 | a | on/on | on/(on) | on/on |
|  |  | b | off/off | off/(on) | off/off |
|  | ET-2 | a | on/on | on/(on) | on/off |
|  |  | b | off/off | off/(on) | off/on |

TABLE 2

| recovery mode | 1st trial | 2nd trial | 3rd trial | typical example |
|---|---|---|---|---|
| mode 1 | span switching | line recover | path recover | mesh network |
| mode 2 | span switching | BLS/2F | path recover | 2 fiber ring/mesh combination |
| mode 3 | BLS/4F | path recover | — | 4 fiber ring/mesh combination |
| mode 4 | UPS | path recover | — | 2 fiber ring/mesh combination |

On the other hand, the UPS function by cross-connection module 15 is consisted by using only the operational modules 10A and 10C of the opposite directions (WEST, EAST). The operation is as follows. The received signals of module 10A are connected through connection line 19 to module 15. And, only the signals to be locally dropped are extracted, and the remaining signals are passed through. At the same time, the added signal is inserted into the dropped time slot, for the transmission through connection line 22 and time switch Tsw (only terminal "a" is selected) of module 10C And, the signal received from module 10C is allocated to the protection exclusive signal, which is connected through line switch Lsw and connection line 21 to cross-connection module 15. In cross-connection module 15, if the dropped signal connected through connection line 19 is normal, only the corresponding signals is eliminated, and the associated signal as in connection line 22 is inserted into the corresponding time slot to trnasmit it through connection line 20 and time switch Tsw of module 10A to the opposite side. If the dropped signal connected through connection line 19 is in failure, the signal in trouble is switched to the signal connected through connection line 21 in order to recover the failure.

Figure 3E:
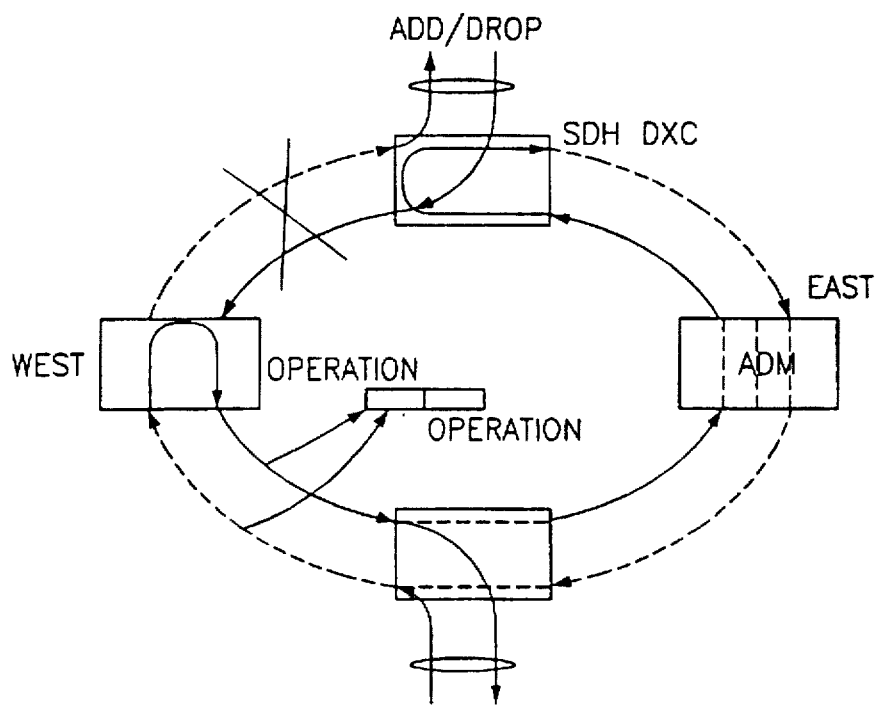
Figure 3F:
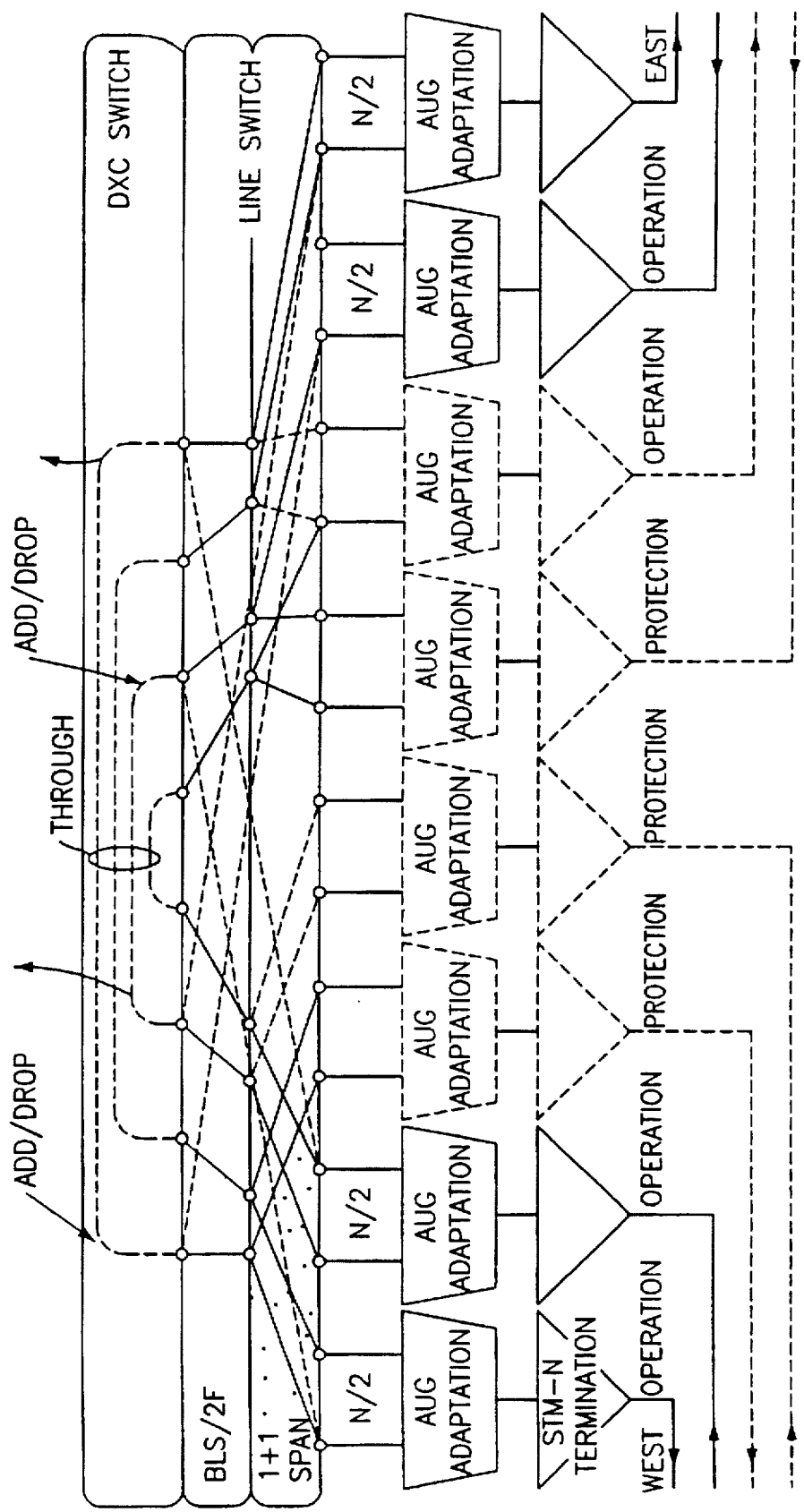
Figure 3G:
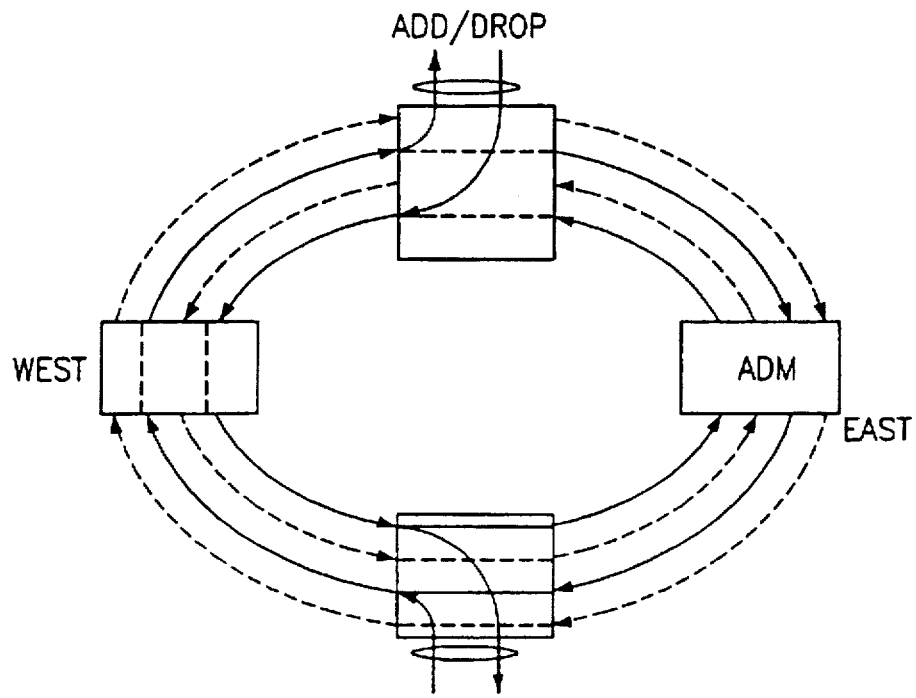
Figure 3H:
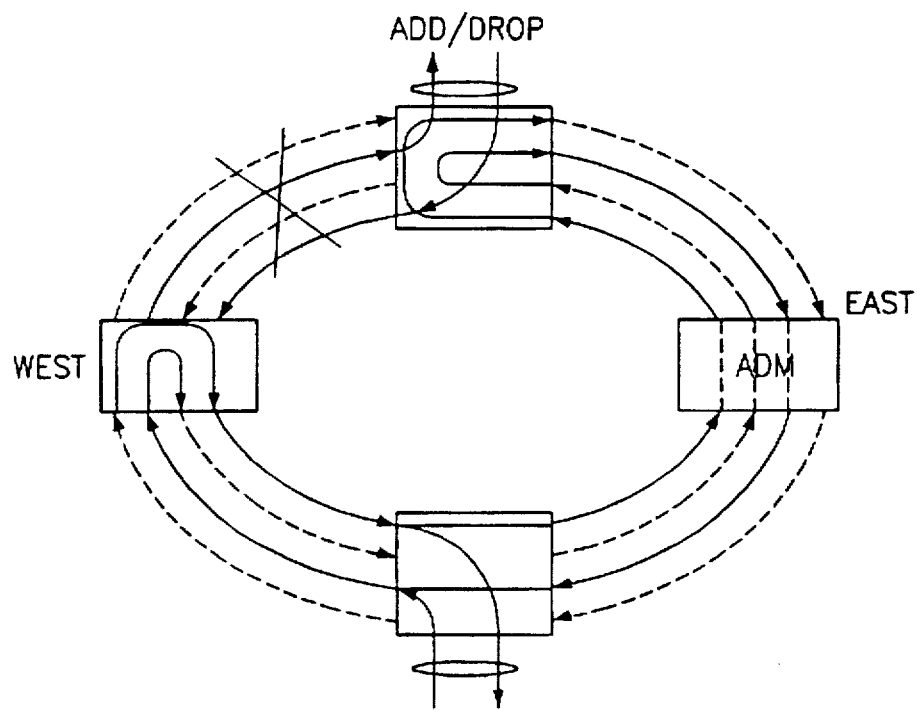
Figure 31:
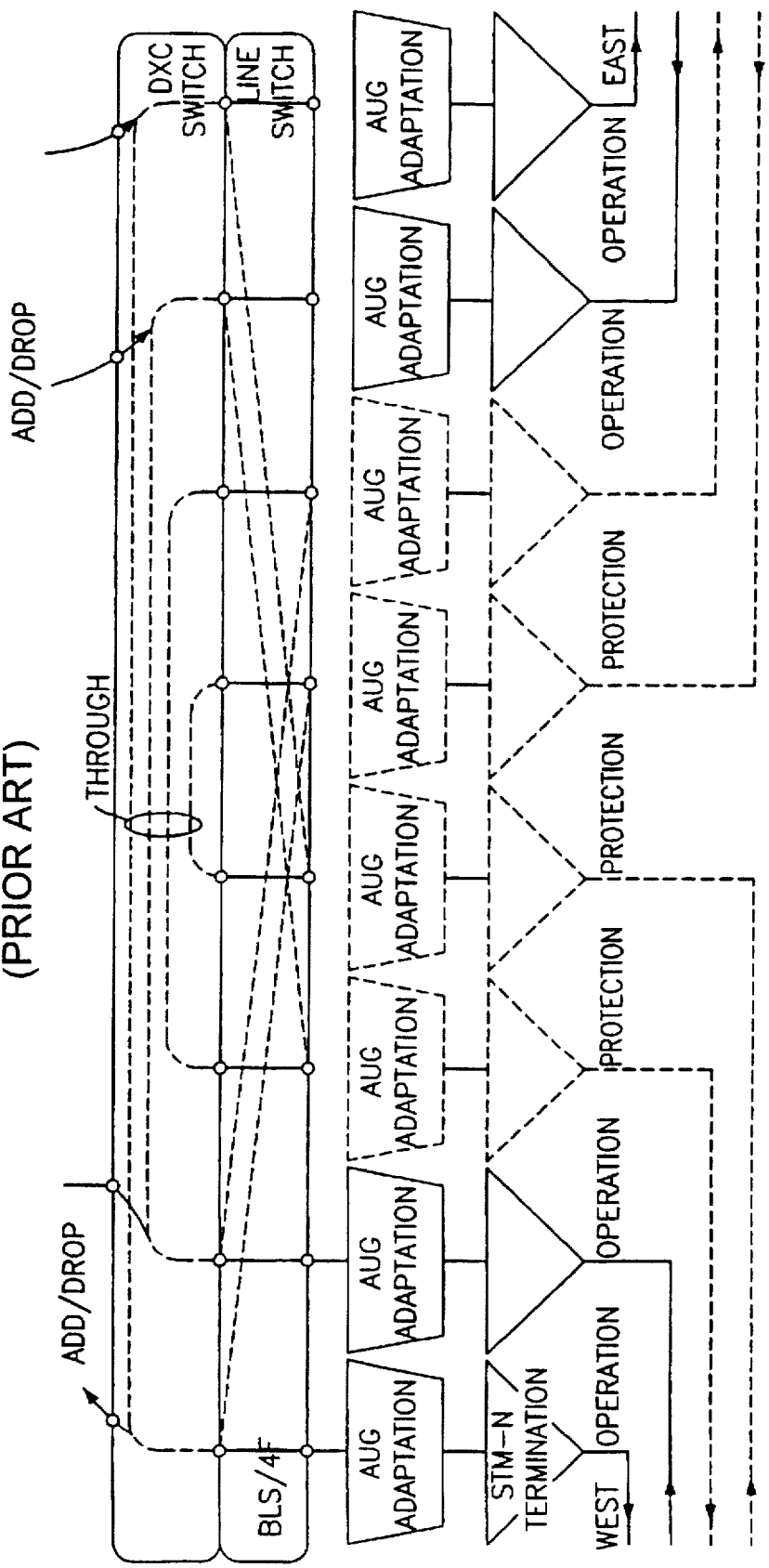
Figure 3J:
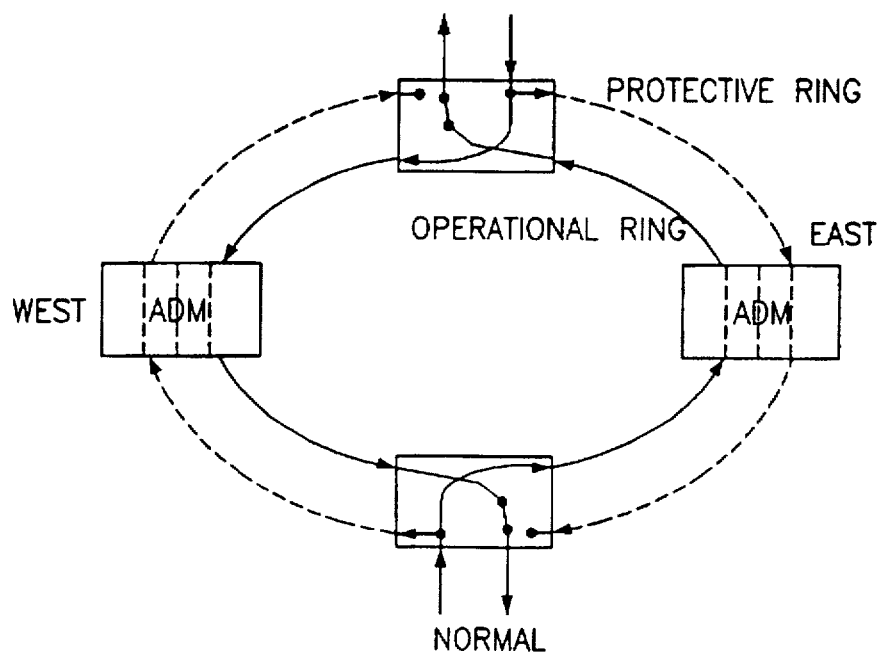
Figure 3K:
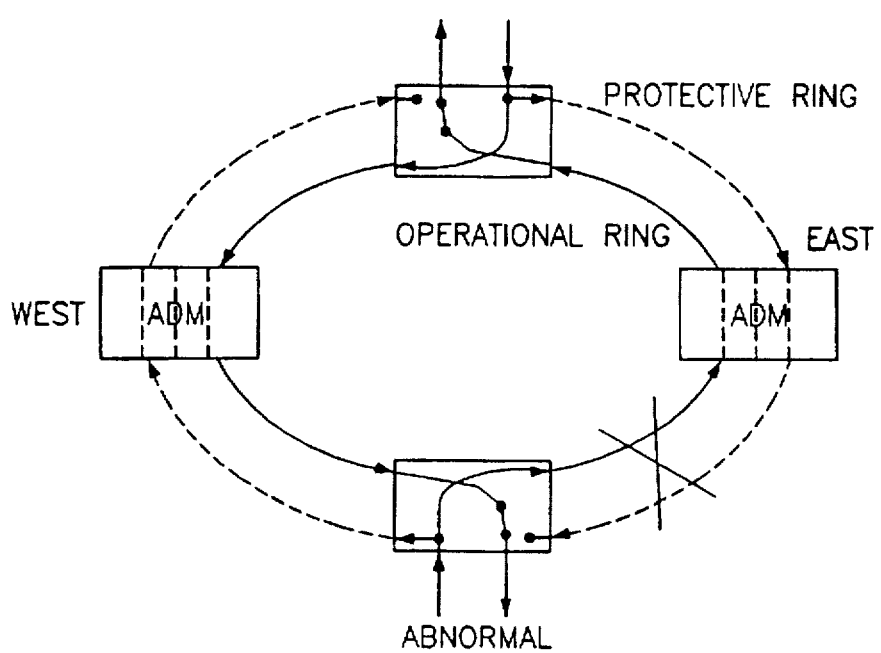
Figure 3L:
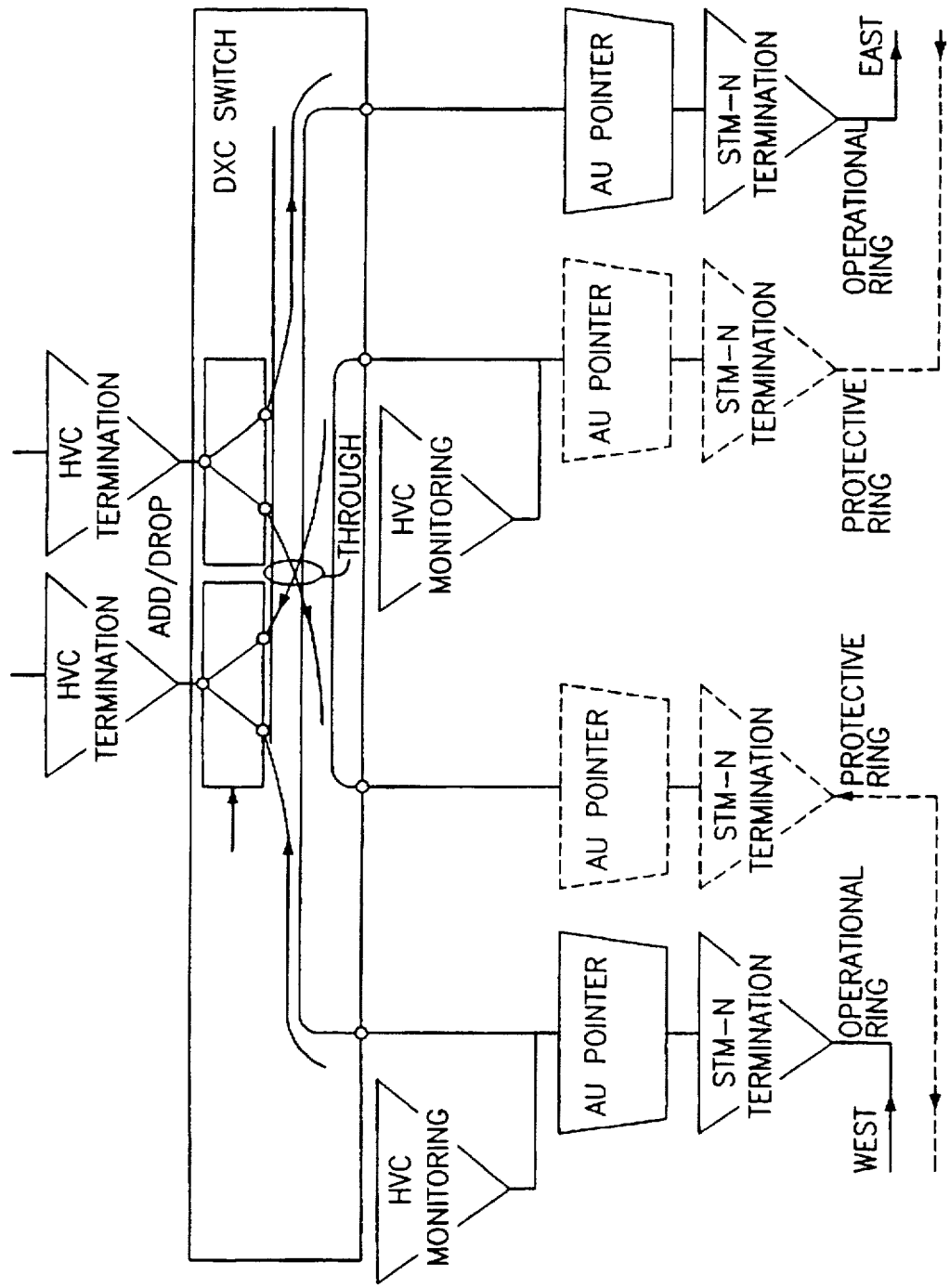
Figure 3M:
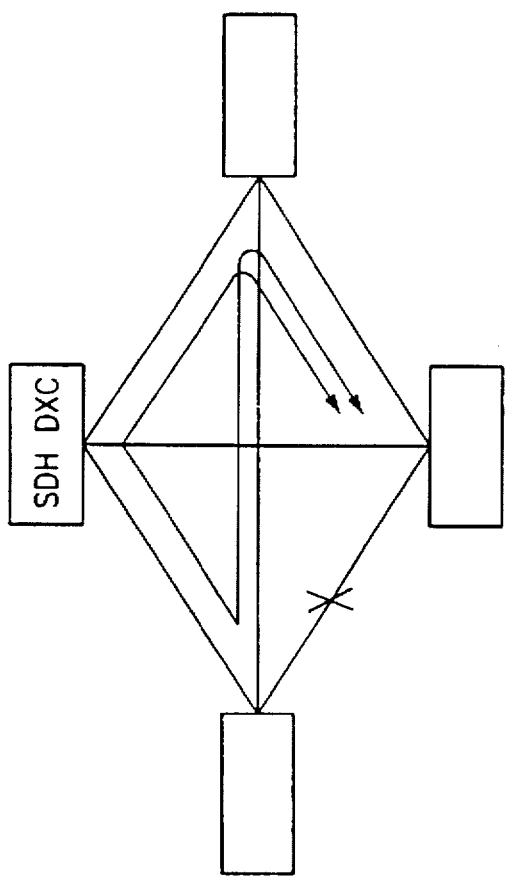
Figure 3N:
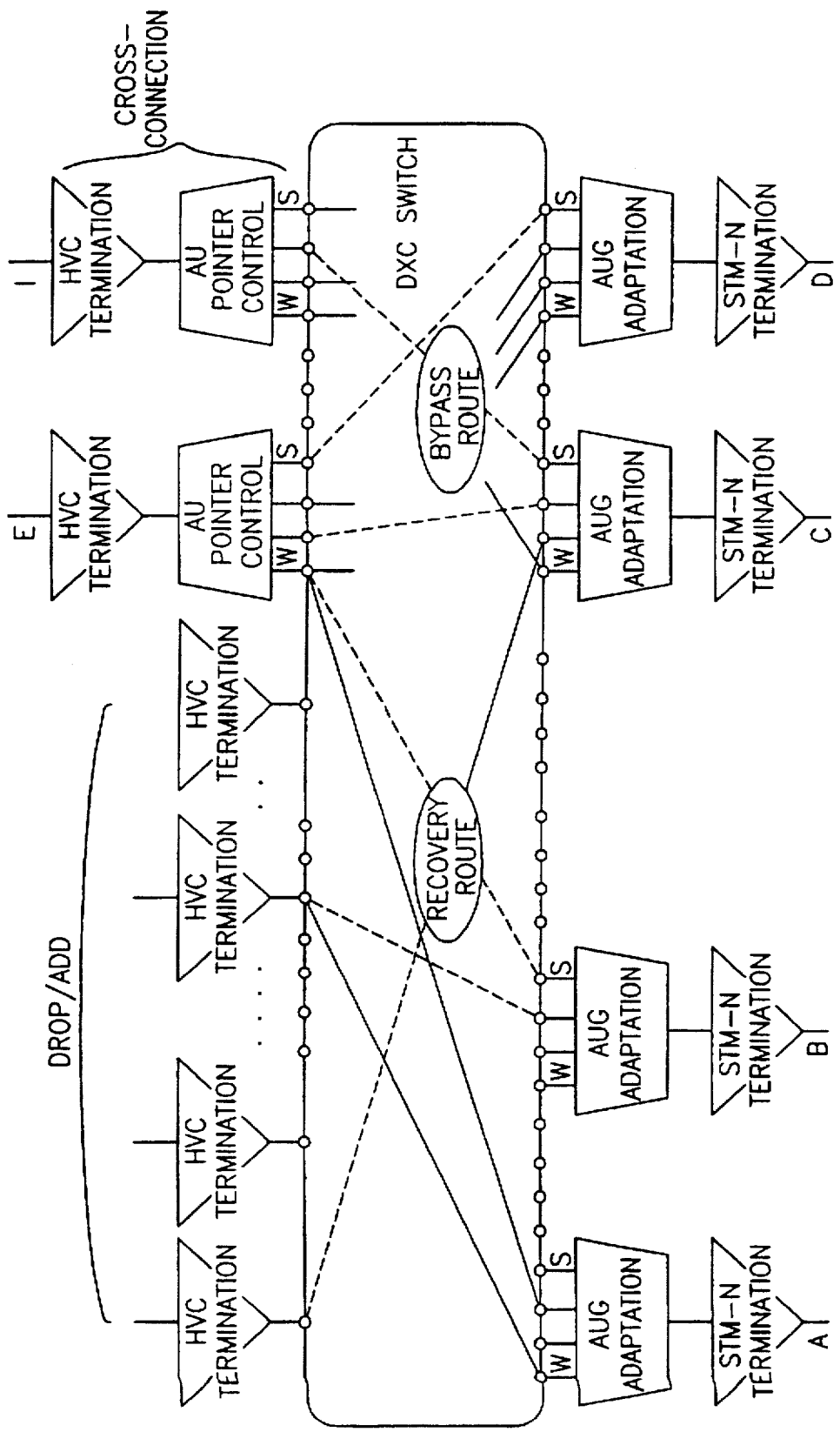

Next, the operation for the SHM function performed by cross-connection module 15 will be described. SDH DXC has the mesh type configuration connecting the plurality of links other than two routes (EAST, WEST) shown in FIG. 4, thus span protection and the plurality of connection lines 19 to 22 which are related with the above described span protection and SHR, is connected to cross-connection module 15. Using the channels on any link, bypass route is consisted by switching cross-connection module 15 in order to recover the network. These principles of SHM is similar to those of FIG. 3E. Referring to FIG. 3E, when the pressure loss is detected in the own SDH DXC, the corresponding channel is received through the bypass route formed by the other SDH DXC, and in the own SDH DXC, the loss route is recovered by switching to the bypass route. Further, the bypass route is consisted in the local SDH DXC by using the spare channels for the loss channels by the trouble detected in the other office.

M×M cross-connection (DXC) switch in FIG. 4 has the function of cross-connecting the mesh network each other. And, when the ring networks as shown in FIG. 3B to 3D is applied, the M×M cross-connection (DXC) switch in FIG. 4 has the function of classifying the signals into the signals to be locally added/dropped, and the signals to be transmitted to the network node except the coressponding ring, and passing the remaining signals to the opposite node of the corresponding ring. At this time, the signals on the connection lines 19 and 21 connected directly to DXC switch, is protected from the troubles by the functions as in FIG. 3A to 3C.

It should be noted that, M×M cross-connection (DXC) switch must have the characteristics of non-blocking, basically. For this end, when cross-connection (DXC) switch comprises front side time switch Tf+the space switch S+the back side time switch Tb, the space switch S is consisted by 2 planes having the n×n space switching capacity, respectively, and at the same time, the front and back side time switches T consisted to have M/n×2M/n capacity, so as to have the functions of adjusting the time slot and connecting the space switch having 2 planes for the prevention of the collision on the space switch S.

Figure 5:
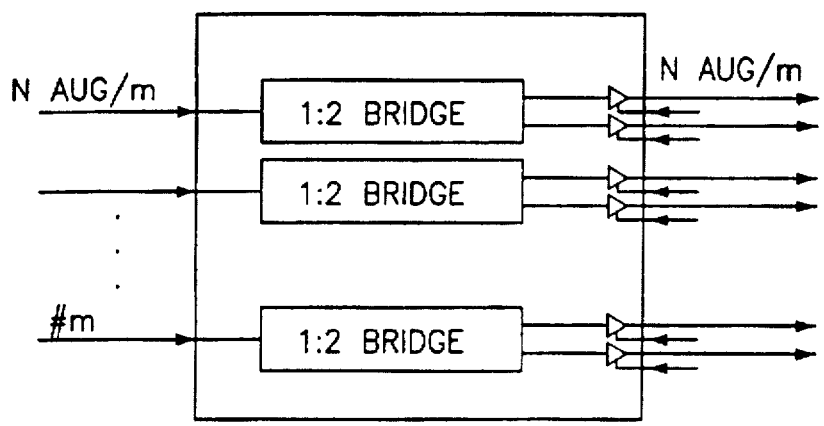
FIG. 5 is a schematic diagram of the line switch shown in FIG. 4.
Figure 6:
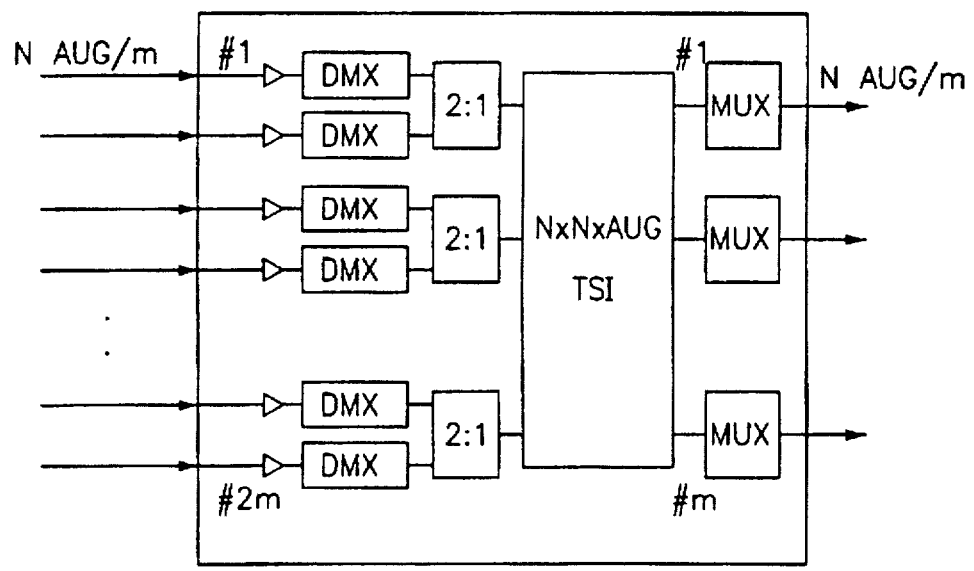
FIG. 6 is a schematic diagram of the time switch shown in FIG. 4.

When the cross-connection module 15 is utilized as the space switch S network consisted by 2 planes, and the front and back side time switches T is applied to I/O 10A to 10C, the front side time switch Tf and the back side time switch Th can be integrated into line switch Lsw and time switch Tsw which is consisted for the purpose of the protection of the span and ring networks. For such a configuration, the configurational conditions of line switch Lsw and time switch Tsw should be as follows. If the signal processing unit of I/O module of FIG. 4 is set as a grade of STM-N, and the capacity of the interface between I/O module and cross-connection (DXC) is set to be N AUG/m, the ratio of the number of input and output N AUG/n signals in line switch Lsw should be m:2m as in FIG. 5, and the ratio of the number of input and output signals in time switch Tsw should be 2m:m as in FIG. 6, at each I/O module. And, it is required that the AU signal unit for input should be 2:1 switching, and TSI (time slot interchange) should be N×N× AUG.

Figure 7:
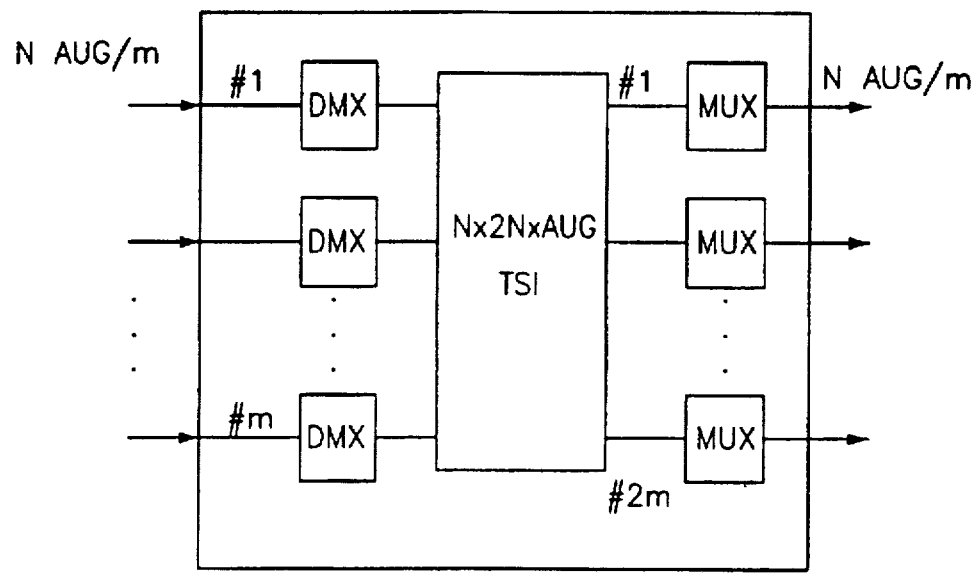
FIG. 7 is a schematic diagram of the front side time switch for the digital cross-connect (DXC) module shown in FIG. 4.
Figure 8:
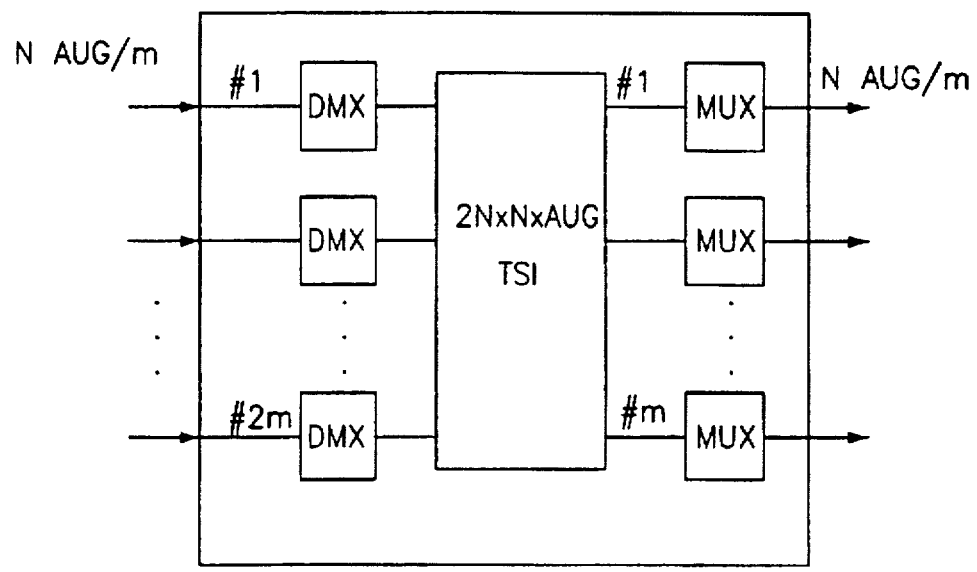
FIG. 8 is a schematic diagram of the back side time switch for the digital cross-connect (DXC) module shown in FIG. 4.

And, the front side switch Tf of cross-connection (DXC) switch should have TSI capability of N×2N×(AUG), in order to have 1:2 ratio of the number of input and output signal as in FIG. 7 for the 2 planes configuration of space switch S. At the same time, the back side time switch Th should have TSI capability of 2N×2N×(AUG), in order to have 2:1 ratio of the number of input and output signal as in FIG. 8.

Accordingly, for the integration of line switch Lsw and the front side switch Tf and the integration of time switch Tsw and the back side switch Th, it needs m×4m×(N AUG/m) of line switch Lsw, and 4m×m(N AUG/n) of time switch Tsw. At the same time, as for unit switch Usw which will be used for applying these as a single device, it needs 4m×4m of the signals of N AUG/m capacity between input/output, and 4N×4N×(AUG) of the TSI capacity.

Figure 9:
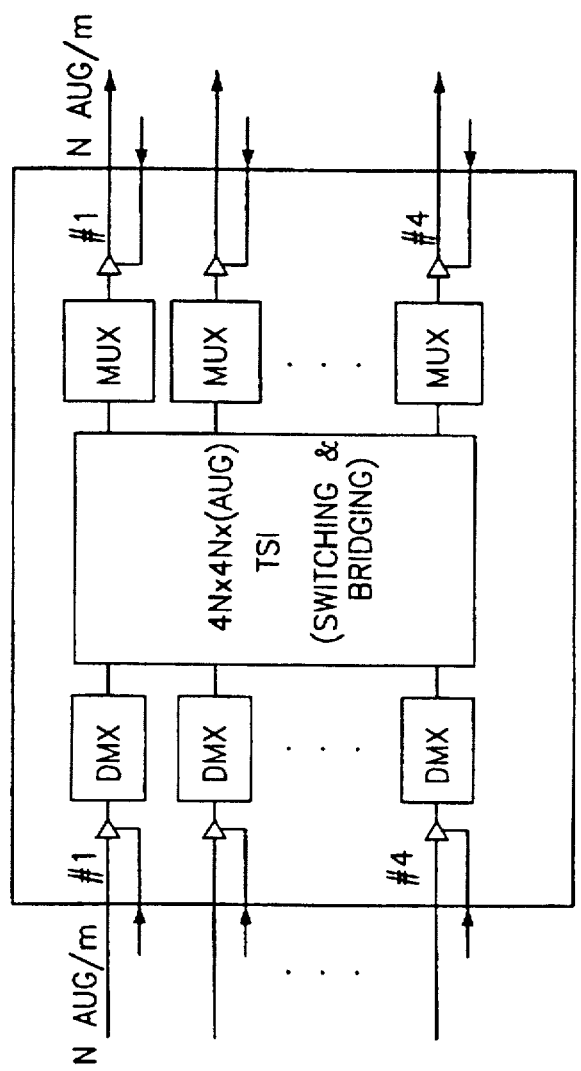
FIG. 9 is a schematic diagram of the unit switch.
Figure 10:
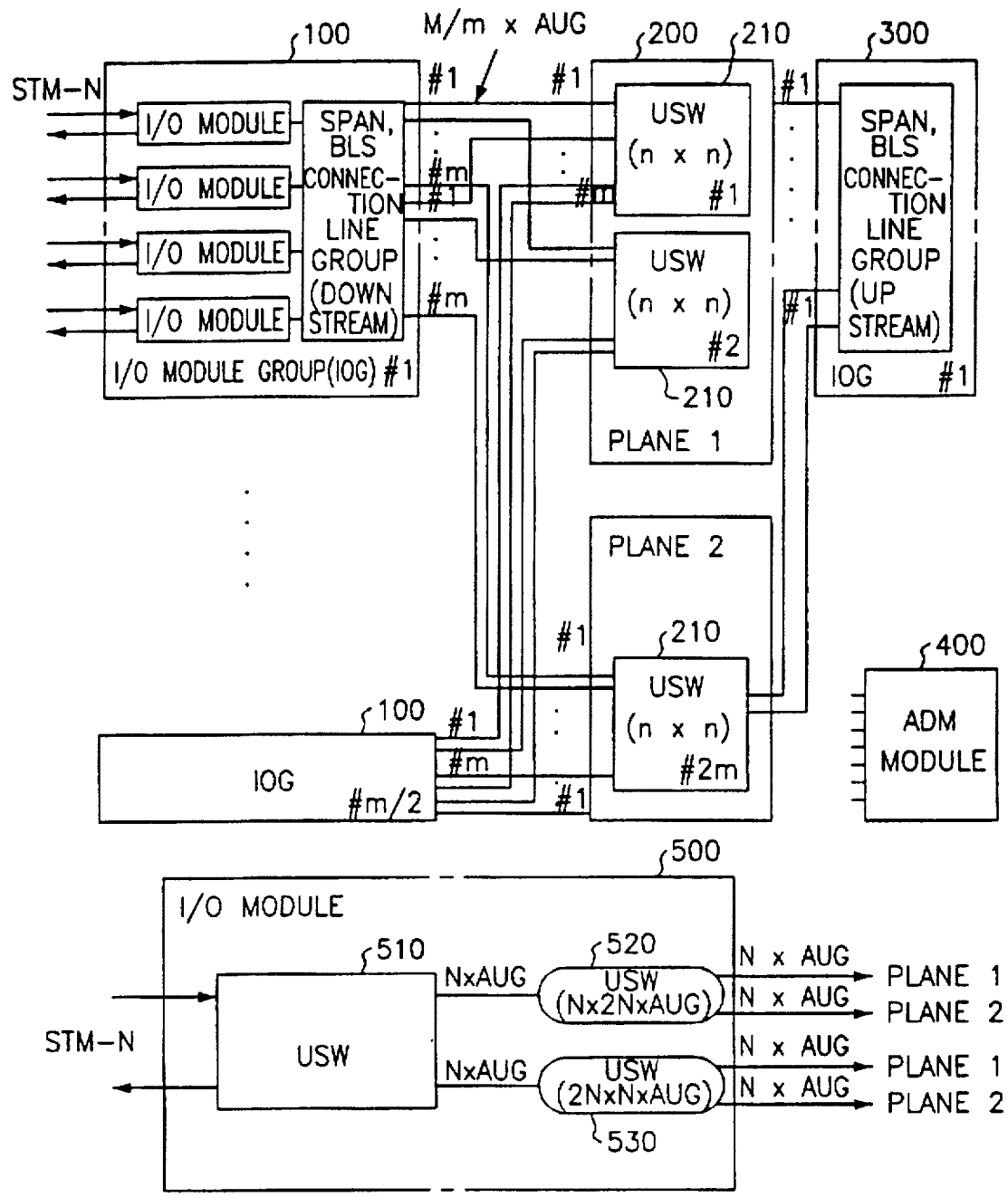
FIG. 10 is a schematic diagram according to an another embodiment of the present invention.

The configuration of unit switch Usw is as shown in FIG. 9. If such a unit device is applied in line switch Lsw and the front side switch Tf, time switch Tsw and the back side switch Tb, and space switch S for cross-connection (DXC), the configuration of the network protective/recovering device of FIG. 4 can be rearranged as shown in FIG. 10. Referring to FIG. 10, the downstream unit switch Usw 520 mounted on the I/O module has the function of line switch Lsw and the front side switch Tf; upstream unit switch Usw 530 has the function of time switch Tsw and the back side switch Tb; and the switch network 200 which is composed of plurality of switch Usw has the switching function performed by the above cross-connection (DXC).

In such a configuration, unit switch Usw 520 composed of m of the number of input, 4m of the number of output, and N×4N×(AUG) of TSI as shown in FIG. 10; unit switch Usw 530 composed of 2m of the number of input, m of the number of output, and 4N×N×(AUG) of TSI; and unit switch Usw 210 composed of maximum m of the number of input, 4m of the number of output, and N×4N×(AUG) of TSI capability. Through the above applications, unit switches Usw 520 and 530 performs of the time slot changing function for span switching and BLS, as well as non-blocking cross-connection (DXC) of unit switch Usw 210, and said unit switch Usw 210 performs DXC, ADM, SHM, UPS etc. through the 2 planes configuration, each plane of which has N×N of the switching capacity.

When the operational ring and the protective ring is configured by using the I/O module 10A to 10C among the above network protective methods, in order to realize the BLS/2F, BLS/4F and UPS types, the troubles on any operational modules can be repaired by simple switching of the module in failure, without any effect on the services, if the links on the operational modules 10A and 10C and the protective modules 10B and 10D, and the wirings 16 to 22 between each module.

The configuration of the network protective/recovering method for SDH DXC can be applied independently or compositely according to the SDH DXC application network. Specifically, if SDH DXC is connected to STM-N terminal among the various STM-N links which is connected to SDH DXC, only 1+1 span switching can be applied. If plurality of SDH DXC is connected, 1+1 span switching is applied at first, before the application of SHM as the second step, only when the case of incapability of recovery. And if SDH DXC is connected to a single ring composed of ADM device, only BLS/2F, BLS/4F and UPS types can be independently applied per each according to the mounting function of ADM. In the ring+mesh network in which both of ADM device and SDH DXC are applied, span swirching or SHR recover are attempted at first, and then SHM recovery is attempted through the correlation between SDH DXCs in case of incapability of recover. The above recovery system can be summarized as TABLE 2, and the flow chart thereof is as FIG. 11. In consideration of the network configuration type compose of each connection link of SDH DXC, and the total network configuration type related with the signals processed in SDH DXC, such a stepwise network recovery flow can be set at the step of SDH DXC installation. And, the recovery system can be adapted to change through the simple software control of SDH DXC, according to the change or development of the network configuration.

What is claim is:

1. Composite network protective/recovering device, comprising:

first to fourth input/output (I/O) modules, wherein the first and third I/O modules are operational modules and the second and fourth I/O modules are protective modules;

a first span connection group connected between said first I/O operational module and said second I/O protective module, and a second span connection group between said third I/O operational module and said fourth I/O protective module, respectively to perform span switching;

a first bidirectional line switching ring connected between said first I/O operational module and said third I/O operational module to form a bidirectional ring having two lines in each direction;

a second bidirectional line switching ring connected to said first to fourth I/O modules to form transmitting/receiving operational lines including two lines in each direction and protective lines including two lines in each direction; and cross-connection (DXC) module for cross-connecting signals transferred through said I/O modules and for classifying signals to be added or dropped.

2. Composite network protective/recovering device according to claim 1, wherein each of said I/O modules comprises:

a photoelectric conversion unit for photoelectrically converting optical signal which is inputted from the outside;

a termination unit for terminating the optical signal which is outputted from said photoelectric conversion unit;

dualized adaptation units having a first adaptation unit and a second adaption unit, for performing the phase alignment of the optical signal which is terminated in said termination unit;

line switch (Lsw) for switching the output of the first adaptation unit; and time switch (Tsw) for switching the transmitted signal in order to transmit the signal to said dualized adaptation units.

* * * * *